United States Patent
Lucash et al.

(10) Patent No.: US 9,544,385 B1
(45) Date of Patent: Jan. 10, 2017

(54) PROVIDING SECOND CONTENT ITEMS IN ASSOCIATION WITH FIRST CONTENT ITEMS

(71) Applicant: Google Inc., Mountain View, CA (US)

(72) Inventors: Nathan P. Lucash, San Francisco, CA (US); Venu Vemula, San Ramon, CA (US); Lukasz Bieniasz-Krzywiec, Sunnyvale, CA (US); Alessio Pace, San Francisco, CA (US); Radoslav M. Kirov, San Francisco, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 14/187,801

(22) Filed: Feb. 24, 2014

(51) Int. Cl.
*G06F 15/16* (2006.01)
*H04L 29/08* (2006.01)
*G06F 17/24* (2006.01)
*G06Q 30/00* (2012.01)

(52) U.S. Cl.
CPC .................... *H04L 67/26* (2013.01)

(58) Field of Classification Search
CPC .............. G06F 17/30905; G06F 17/212; G06F 17/30867; G06F 17/2247; H04L 43/0876; H04L 67/22
USPC ................. 709/203, 217, 227, 245
See application file for complete search history.

(56) References Cited

U.S. PATENT DOCUMENTS

| | | | |
|---|---|---|---|
| 8,166,029 B2 | 4/2012 | Park et al. | |
| 8,478,903 B2 * | 7/2013 | Farber ................. | G06F 9/505 709/219 |
| 2003/0005052 A1 | 1/2003 | Feuer et al. | |
| 2006/0053050 A1 * | 3/2006 | Schweier ............. | G06Q 30/02 705/14.43 |
| 2007/0028185 A1 * | 2/2007 | Bhogal ................ | G06F 17/30899 715/808 |
| 2008/0009344 A1 * | 1/2008 | Graham ............... | G07F 17/32 463/25 |
| 2008/0228870 A1 * | 9/2008 | Schweier ............. | H04L 67/02 709/203 |
| 2008/0294523 A1 * | 11/2008 | Little .................. | G06Q 30/02 705/14.53 |

(Continued)

FOREIGN PATENT DOCUMENTS

DE    10138817 A1    3/2003
WO    2008130270    10/2008

*Primary Examiner* — David Lazaro
*Assistant Examiner* — Vitali Korobov
(74) *Attorney, Agent, or Firm* — Fish & Richardson P.C.

(57) ABSTRACT

Methods, systems, and apparatus include computer programs encoded on a computer-readable storage medium, including a method for providing content. A first call for content to be published on a resource associated with a publisher is received from a requesting device. A determination is made when the publisher has authorized additional content item calls to be automatically generated responsive to receipt of the first call. A first content item responsive to the first call is determined. A message including call parameters is generated that define publisher or serving system criteria for the additional content items. The first content item and message responsive to the first call are provided. A second call for content, in conformance with the call parameters, is received after processing the message. A second different content item that is responsive to the second call is provided for publication on the resource along with the first content item.

20 Claims, 4 Drawing Sheets

(56) References Cited

U.S. PATENT DOCUMENTS

| | | | |
|---|---|---|---|
| 2009/0099862 A1* | 4/2009 | Fireman | G06F 19/3418 705/2 |
| 2009/0171710 A1 | 7/2009 | Shrivathsan et al. | |
| 2010/0105454 A1* | 4/2010 | Weber | G06Q 30/02 463/1 |
| 2012/0072936 A1 | 3/2012 | Small et al. | |
| 2013/0019015 A1* | 1/2013 | Devarakonda | G06F 9/5072 709/226 |
| 2013/0080642 A1* | 3/2013 | Adam | G06F 15/173 709/226 |
| 2013/0091285 A1* | 4/2013 | Devarakonda | G06F 9/4856 709/226 |
| 2013/0185413 A1* | 7/2013 | Beaty | G06F 9/5072 709/224 |
| 2014/0075013 A1* | 3/2014 | Agrawal | G06F 11/3495 709/224 |
| 2014/0245125 A1* | 8/2014 | Ozgul | G06F 17/212 715/234 |
| 2015/0019350 A1* | 1/2015 | Grant | G06Q 30/0275 705/14.71 |
| 2015/0039417 A1* | 2/2015 | Schweier | G06Q 30/0246 705/14.45 |
| 2015/0294000 A1* | 10/2015 | Grant | G06F 17/30864 707/706 |

* cited by examiner

PROVIDING SECOND CONTENT ITEMS IN ASSOCIATION WITH FIRST CONTENT ITEMS

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can be provided to a user device such as a personal computer (PC), a smartphone, a laptop computer, a tablet computer, or some other user device. Content can be provided for presentation on web pages under the control of publishers.

SUMMARY

In general, one innovative aspect of the subject matter described in this specification can be implemented in methods that include a computer-implemented method for providing content. The method includes receiving a first call for content from a requesting device to be published on a resource associated with a publisher. The method further includes determining, by one or more processors, when the publisher has authorized one or more additional content item calls to be automatically generated responsive to the receipt of the first call. The method further includes determining a first content item responsive to the first call. The method further includes generating a message including one or more call parameters, the call parameters defining one or more publisher or serving system criteria for the one or more additional content items. The method further includes providing the first content item and the message responsive to the first call. The method further includes receiving a second call for content after processing of the message by the requesting device wherein the second call is in conformance with the one or more call parameters. The method further includes determining a second different content item responsive to the second call, and provide the second different content item for publication on the resource along with the first content item.

These and other implementations can each optionally include one or more of the following features. Determining when the publisher has authorized one or more additional content item calls to be automatically generated can include receiving a preference from the publisher that the resource automatically generate additional content item requests based on the initial received request. The preference can apply to a plurality of resources associated with the publisher. Determining when the publisher has authorized one or more additional content item calls includes receiving a verification request from the requesting device and verifying that the publisher is enrolled in a service for automatically generating second calls. Generating the message can include identifying one or more publisher criteria associated with preferences for content to be provided responsive to the second call. Generating the message can include automatically identifying a preferred type or format of content to be provided associated with the second call. Generating the message can include identifying one or more reporting parameters for reporting effectiveness of content delivered in association with the second call. The second different content item can be a floating content item whose placement on the resource is not specified by the publisher. The second different content item can be published at a location in the resource at a position that is self-determined rather than specified by the publisher. The method can further include providing a script to the publisher for inclusion on the resource. The script, when executed, can make the first call for content to a serving system and, responsive the receiving the first content item and message, can generate the second call to the serving system. The second call can operate to request the second different content item without requiring the publisher to specify where on the resource the second different content item will be presented. The second different content item can be presented at a different location on the resource than the first content item. The second different content item can be a floating content item whose location is unspecified by the publisher. The method can further include enabling the second call without requiring the publisher to re-tag the resource and include a specific call for the second different content item. Processing the message can include executing instructions for creating a frame, on the resource, to hold the second different content item, requesting the second different content item, and inserting the received second different content item in the created frame.

In general, another innovative aspect of the subject matter described in this specification can be implemented in computer program products that include a computer program product tangibly embodied in a computer-readable storage device and comprising instructions. The instructions, when executed by one or more processors, cause the processor to: receive a first call for content from a requesting device to be published on a resource associated with a publisher; determine when the publisher has authorized one or more additional content item calls to be automatically generated responsive to the receipt of the first call; determine a first content item responsive to the first call; generate a message including one or more call parameters, the call parameters defining one or more publisher or serving system criteria for the one or more additional content items; provide the first content item and the message responsive to the first call; receive a second call for content after processing of the message by the requesting device wherein the second call is in conformance with the one or more call parameters; and determine a second different content item responsive to the second call, and provide the second different content item for publication on the resource along with the first content item.

These and other implementations can each optionally include one or more of the following features. Determining when the publisher has authorized one or more additional content item calls to be automatically generated can include receiving a preference from the publisher that the resource automatically generate additional content item requests based on the initial received request. The preference can apply to a plurality of resources associated with the publisher. Determining when the publisher has authorized one or more additional content item calls includes receiving a verification request from the requesting device and verifying that the publisher is enrolled in a service for automatically generating second calls.

In general, another innovative aspect of the subject matter described in this specification can be implemented in systems, including a system comprising one or more processors and one or more memory elements including instructions. The instructions, when executed, cause the one or more processors to: receive a first call for content from a requesting device to be published on a resource associated with a publisher; determine when the publisher has authorized one or more additional content item calls to be automatically generated responsive to the receipt of the first call; determine a first content item responsive to the first call; generate a message including one or more call parameters, the call parameters defining one or more publisher or serving system criteria for the one or more additional content items; provide the first content item and the message responsive to the first call; receive a second call for content after processing of the message by the requesting device wherein the second call is in conformance with the one or more call parameters; and determine a second different content item responsive to the second call, and provide the second different content item for publication on the resource along with the first content item.

Particular implementations may realize none, one or more of the following advantages. Additional content items (e.g., advertisements) can be provided for presentation on a web resource without requiring a publisher to add code, tag or re-tag their web site. Publishers can specify to have a second different content item presented automatically without having to specify where on a web resource the content item is to appear. Moreover, the second different content item can have a different look and/or behavior. For example, a floating advertisement can include specialized features such a swiping behavior for dismissing the advertisement. Content providers (e.g., advertisers) can reach more users faster than would otherwise occur if publishers were required to make code changes to receive additional content items. Publishers can add a new advertisement format type to their web pages, e.g., making their web pages more potentially interesting and/or more relevant to the user with minimal effort.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for providing a second different content item in association with a presentation of a first content item. For example, a first call for content can be received (e.g., by a content serving system) from a requesting device to be published on a resource associated with a publisher, such as a request for an advertisement to fill an advertisement slot on the publisher's web page. A determination can be made as to whether the publisher has authorized one or more additional content item calls to be automatically generated responsive to the receipt of the first call. In response the first call for content (e.g., for an advertisement), a first content item can be determined. A message can be generated that includes one or more call parameters that define one or more publisher criteria or serving system criteria for requesting the one or more additional content items. The first content item and the message can be provided responsive to the first call, e.g., for presentation of the requested advertisement on the publisher's web resource. The receiving device can process the message and generate a request for another content item, e.g., in the form of a second call for content that is in conformance with the one or more call parameters included in the message. For example, a second call can be facilitated using a code (e.g., JavaScript™ code) that executes prior to handling the first content item. Upon receipt of the second call for content, the content serving system, for example, can determine a second different content item responsive to the second call, and provide the second different content item for publication on the resource (e.g., along with the first content item). For example, the second different content item is a different advertisement from the first advertisement, and can be presented on the publisher's web resource at a predetermined location, e.g., as a floating advertisement at the bottom of the web resource.

In some implementations, the second different content items can be, for example, floating advertisements, such as advertisements that appear over the top of web resource content at a predetermined location. Floating advertisements, when provided at the bottom of a page, for example, can remain there and appear not to move, even when the web page is scrolled or paged down. In some implementations, users can dismiss floating advertisements in certain ways, e.g., by using a swiping gesture. In some implementations, information can be logged (and subsequently reported) that includes statistics for events associated with floating advertisements, such as dismissal events and/or the average time elapsed before dismissal occurs. In some implementations, publishers can access performance information associated with floating advertisements. Other presentations and user interactions are possible for floating advertisements and, in general, second different content items.

Figure 1:
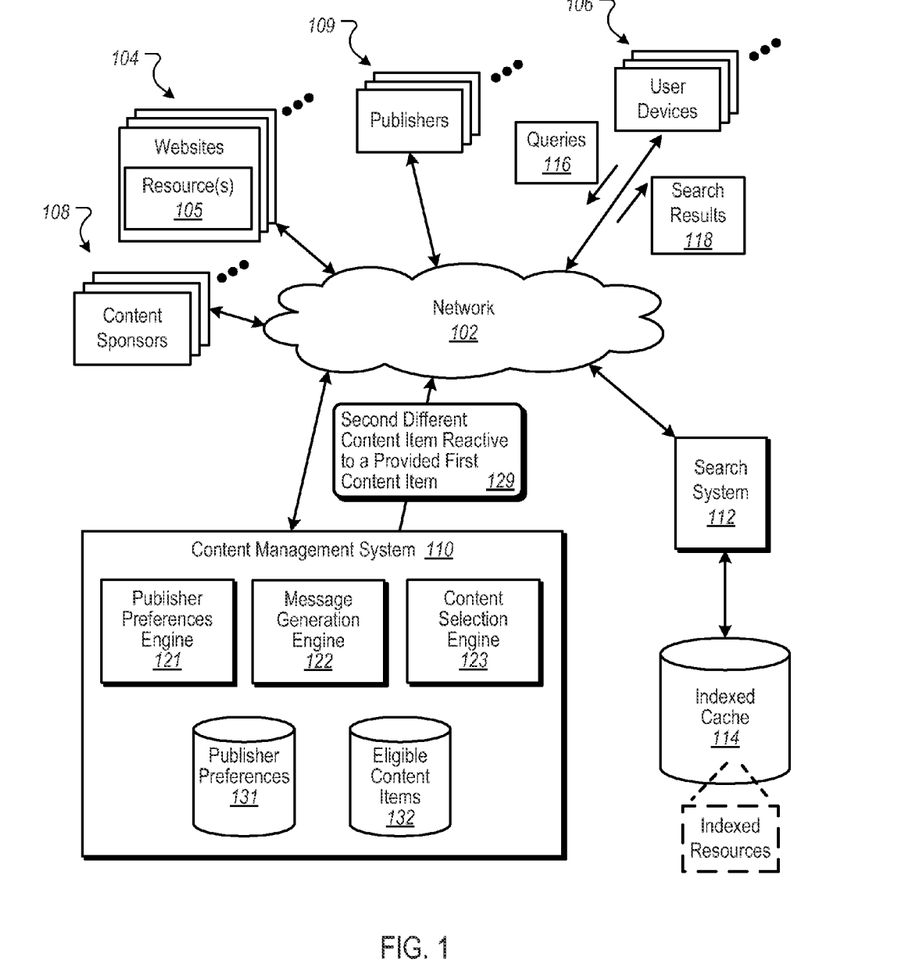
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, the content management system 110 can provide a second different content item 129, e.g., that is reactive to a received request for a first content item. For example, publishers 109 can specify conditions and/or situations in which a second different content item is to be automatically requested and provided. When such a situation occurs, the content management system 110 can provide parameters for requesting the second different content item 129, for example, without any specific input from the publishers and without requiring the publishers to append code or tags to their respective web resources. The parameters can accompany, for example, a responsive first content item that is provided in response to a first call for content received from the user device 106. Using the parameters, the user device 106 can generate a second call for content to be sent to the content management system 110, which can provide the second different content item 129 in response to the second call. More detailed information is provided below with respect to FIG. 2.

The environment 100 can include plural data stores, which can be stored locally by the content management system 110, stored somewhere else and accessible using the network 102, generated as needed from various data sources, or some combination thereof. A data store of publisher preferences 131, for example, can include information about how and when resources 105 in control of publishers 109 are to allow the generation of second different content items reactive to first content items. For example, for any given resource (e.g., a publisher's web page), the preferences can indicate that second different content items are to be used and that they are to be presented in a certain way on the resource. Example ways of presenting the second different content item include whole page, interstitial, and specific placements (e.g., at the left side, the right side, the top or the bottom of the page). In some implementations, publisher preferences as to the placement and the type of a content item are not required, and a default can be used (e.g., to create a floating advertisement at the bottom of the page).

A data store of eligible content items 132, for example, can include content items that can be provided in response to a request for content. For example, the content items can be advertisements that can be provided to fill a content item slot on a publisher's web page or on a page showing search results.

The content management system 110 can include plural engines. A publisher preferences engine 121, for example, can determine when a publisher has authorized one or more additional content item calls to be automatically generated responsive to the receipt of a first call for content. For example, the first call for content can be received from a requesting device for a content item to be published on a resource associated with a publisher. The publisher preferences engine 121 can also receive publisher preferences from publishers 109, e.g., for storage in the data store of publisher preferences 131 (and in advance of receiving requests for content and using the second different content item feature).

A message generation engine 122, for example, can generate a message that includes one or more call parameters defining one or more publisher or serving system criteria for the one or more additional content items. For example, the message that is generated by the message generation engine 122 can be sent with a first content item for subsequent use in generating a second call for content, e.g., for the second different content item.

A content selection engine 123 can determine content items that are responsive to requests. For example, the content selection engine 123 can determine an advertisement for a first call for content and a second different content item for a subsequent second call for content. The content selection engine 123 can select the content items, for example, from the eligible content items 132 using selection criteria as described above, and/or based on publisher criteria.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the URL of the webpage. Search results pages can also include one or more slots in which other content items (e.g., ads) can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection or other interaction with) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as republishing or sharing the content item. Other actions that constitute a conversion can also be used.

Figure 2:
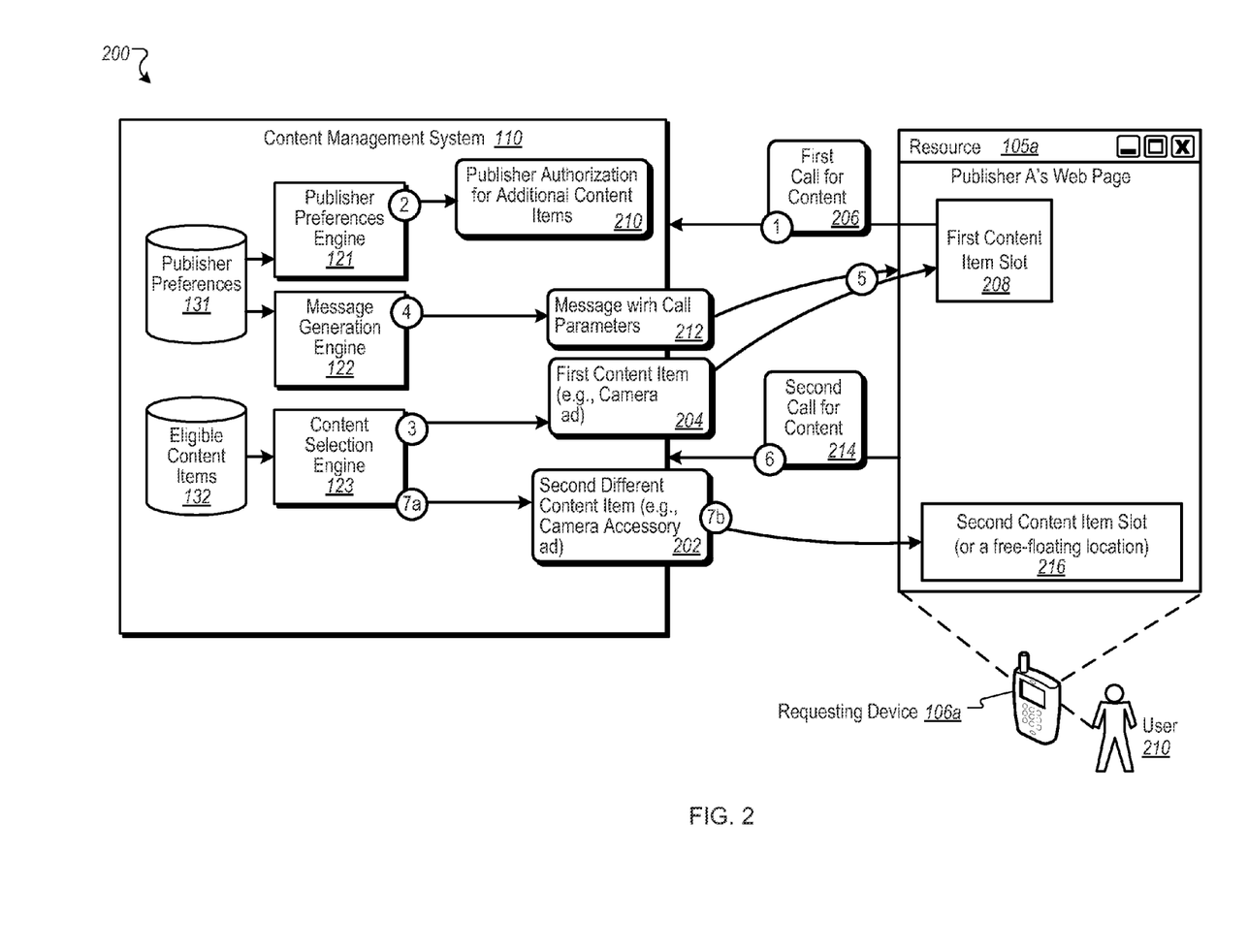
FIG. 2 shows an example system for providing a second different content item in association with a first content item provided on a resource.

FIG. 2 shows an example system 200 for automatically providing a second different content item 202 after receiving a call for a first content item 204 provided on a resource 105a. For example, for a publisher 109 who has authorized the generation of additional content items, the content management system 110 can generate a message 212 to be included with the delivery of the first content item 204 to a requesting device 106a. The message 212 can include, for example, call parameters by which the resource 105a can make a call for content (e.g., a request) that results in the selection of the second different content item 202. A more detailed example follows using an example sequence of stages 1-7b.

At stage 1, for example, the content management system 110 can receive a first call for content 206 from the requesting device 106a. The first call for content 206, for example, can be a request for a content item (e.g., an advertisement) to be published on the resource 105a associated with a publisher, e.g., Publisher A, the publisher of a camera-related web page. The request, for example, can be a request to fill a first content item slot 208 on Publisher A's web page.

At stage 2, for example, the publisher preferences engine 121 can determine whether Publisher A has authorized automatic secondary content item requests. For example, information for Publisher A in the publisher preferences 131 can indicate that an authorization 210 exists by which Publisher A has specified that identification and generation of a second different content item is authorized whenever a request for content originates from the resource 105a. In some implementations, determining the authorization 210 can include receiving (e.g., with the first call for content 206) a declaration of eligibility that the publisher 109 is eligible for automatic generation of a second different content item.

At stage 3, for example, the content selection engine 123 can determine the first content item 204 responsive to the first call for content 206. For example, using information associated with the first content item slot 208 and/or other information in the first call for content 206, the content selection engine 123 can identify the first content item 204, e.g., an advertisement for a camera.

At stage 4, for example, the message generation engine 122 can generate a message 212 including one or more call parameters that define one or more of publisher criteria or serving system criteria for the one or more additional content items. The call parameters that are included in the message 212 can include information needed to make an additional call for content, e.g., a content item request for content to be provided somewhere on or associated with the resource 105a. The publisher criteria, for example, can include call parameters that are needed on Publisher A's web page to make a second request for content. The serving system criteria, for example, can include the call parameters needed by the content management system 110 to process the request. Call parameters that are needed, for example, can be specific to a particular content management system 110 and/or specific to a particular publisher 109 and resource 105a.

At stage 5, for example, the content management system 110 can provide the first content item 204 (e.g., camera-related advertisement) and the message 212 responsive to the first call for content 206. For example, the content management system 110 can provide the first content item 204 to the requesting device 106a, for presentation in the first content item slot 208 on the resource 105a. The message 212 that is included with the provided first content item 204 can include call parameters needed for another call for content, e.g., a request by the requesting device 106a to the content management system 110 for a second different content item. For example, the message can include publisher identifiers, the slot and/or the type of content item to be requested (e.g., floating advertisement or interstitial advertisement), and/or a set of the minimum parameters needed for making an advertisement request.

At stage 6, for example, a second call for content 214 is received after processing of the message by the requesting device. The second call for content 214, for example, can be in conformance with the one or more call parameters. The second call for content 214 can use information from the received message 212 including the parameters.

At stage 7a, for example, the content selection engine 123 can determine the second different content item 202 responsive to the second call for content 214. For example, the content selection engine 123 can select an advertisement for a camera accessory or some other advertisement. The second different content item 202 that is selected, for example, can be based on call parameters included in the second call for content 214 that indicate the type of advertisement to follow the first advertisement.

At stage 7b, for example, the content management system 110 can provide the second different content item 202 for publication on the resource 105a. As an example, the second different content item 202 can be presented in a second different content item slot 216 or can be free-floating, such as along the bottom of the web page.

Figure 3:
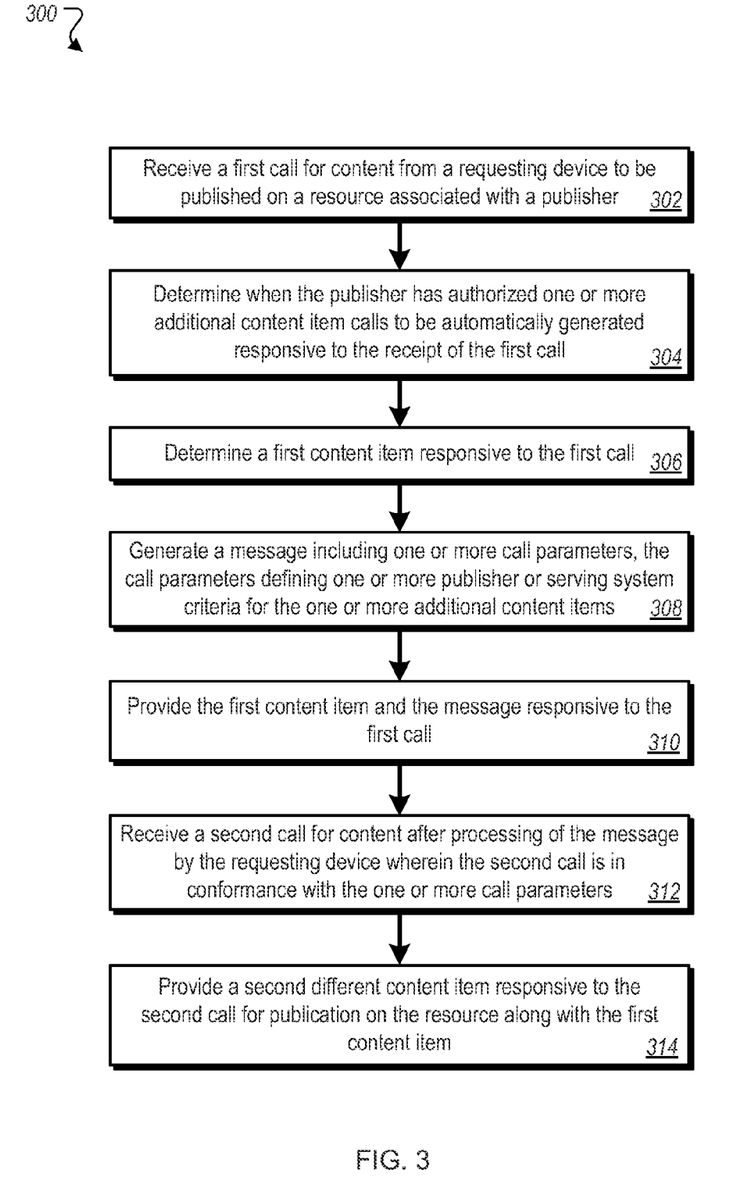
FIG. 3 is a flowchart of an example process for selecting a second different content item responsive to an automatically generated request.

FIG. 3 is a flowchart of an example process 300 for selecting a second different content item after receiving a request for a first content item. In some implementations, the content management system 110 can perform stages of the process 300 using instructions that are executed by one or more processors. FIGS. 1-2 are used to provide example structures for performing the stages of the process 300.

A first call for content to be published on a resource associated with a publisher is received from a requesting device (302). The content management system 110, for example, can receive a first call for content 206 from the requesting device 106a. The first call for content 206, for example, can be a request for a content item (e.g., an advertisement) to be published on the resource 105a associated with a publisher, e.g., a camera-related web page published by Publisher A. The request, for example, can be a request to fill a first content item slot 208 on Publisher A's web page.

A determination is made when the publisher has authorized one or more additional content item calls to be automatically generated responsive to the receipt of the first call (304). For example, the publisher preferences engine 121 can determine whether Publisher A has indicated preferences, e.g., through publisher settings, that the automatic generation of calls for content for secondary content item requests is authorized. In the example, information for Publisher A in the publisher preferences 131 can indicate that an authorization 210 exists by which Publisher A has specified that identification and generation of a second different content item is authorized whenever a request for content originates from the resource 105a.

In some implementations, determining when the publisher has authorized one or more additional content item calls can include receiving a verification request from the requesting device and verifying that the publisher is enrolled in a service for automatically generating second calls. The service, for example, can be a service that is part of the content management system 110, or the service can be a third-party service that is accessible by the content management system 110 using the network 102. The service, for example, can be associated with content that is provided by the content management system 110 and/or by other such systems for providing content in response to a request.

In some implementations, publisher authorization of a second call is not required. For example, some types of secondary content items can be generated automatically in certain situations (e.g., on all video game webpages).

In some implementations, determining when the publisher has authorized one or more additional content item calls to be automatically generated can include receiving a preference from the publisher that the resource is to automatically generate additional content item requests based on the initial received request. For example, the preference can apply to a specific resource (e.g., the resource 105a) or to a plurality of resources associated with the publisher. In some implementations, a publisher can have different settings for different individual or sets of resources. In some implementations, the preferences can include other information, e.g., as to when additional content item requests are to be automatically generated, e.g., certain times of the day, certain users (e.g., based on demographics), device type (e.g., mobile vs. non-mobile), and other information associated with preferences. In some implementations, a decision can be made whether to make the second request based one or more other considerations, such as based purely on the user or overall system features. For example, in case of a fatal bug or load error (or delay) during or in association with presentation of a floating advertisement, a portion or all of the floating advertisements that are associated with the page can be turned off by not responding to the request. In some implementations, on a per-request, per-session, per-time period, or a per-user basis, a decision can be made to show only a predetermined number N of floating advertisements daily. In some implementations, if an incompatible device (e.g., an old browser) is detected, for example, response to the request can be withheld. This "early termination" can be beneficial as compared to sending the second request and not fulfilling it.

A first content item responsive to the first call is determined (306). As an example, in response to the first call for content 206, the content selection engine 123 can determine the first content item 204 (e.g., the camera advertisement). For example, using information associated with the first content item slot 208 and other information in the first call for content 206, the content selection engine 123 can identify the first content item 204, e.g., the camera-related advertisement.

A message is generated that includes one or more call parameters (308). The call parameters can define one or more publisher or serving system criteria for the one or more additional content items. For example, the message generation engine 122 can generate the message 212 including one or more call parameters that define one or more of publisher criteria or serving system criteria for the one or more additional content items. The call parameters that are included in the message 212 can include information needed to generate the second call for content 214. In some implementations, the message includes limited information, only enough to make the second call while the parameters themselves are not passed back down to the requesting device.

In some implementations, generating the message can include identifying one or more publisher criteria associated with preferences for content to be provided responsive to the second call. As an example, the preferences can indicate how the second different content item is to be presented.

In some implementations, generating the message can include automatically identifying a preferred type or format of content to be provided associated with the second call. The preferences can indicate, for example, that the second different content item is to be presented as a whole page advertisement, an interstitial advertisement, or some other type of advertisement. The parameters can also indicate, for example, a preferred placement of the advertisement, e.g. at the left side, the right side, the bottom of the page, or some other location.

In some implementations, generating the message can include identifying one or more reporting parameters for reporting effectiveness of content delivered in association with the second call. For example, the message generation engine 122 can add reporting parameters so that publishers can provide reporting information (e.g., indicating user interactions) back to the content management system 110 or other system.

The first content item and the message responsive to the first call are provided (310). The content management system 110, for example, can provide the first content item 204 and the message 212 to the requesting device 106a, for presentation in the first content item slot 208 on the resource 105a. The message 212 that is included with the provided first content item 204 can include call parameters needed for another call for content, e.g., a request by the requesting device 106a to the content management system 110 for a second different content item.

A second call for content is received after processing of the message by the requesting device. The second call is in conformance with the one or more call parameters (312). As an example, the content management system 110 can receive the second call for content 214 that is in conformance with the one or more call parameters included in the message 212.

In some implementations, processing the message can include executing instructions for creating a frame, on the resource, to hold the second different content item, requesting the second different content item, and inserting the received second different content item in the created frame. For example, when the message 212 is received at the requesting device 106a, processing the received message 212 can cause the creation of an iframe to hold the advertisement, and once it is received, placing the advertisement in the iframe.

A second different content item that is responsive to the second call is determined, and the second different content item is provided for publication on the resource (314). The content selection engine 123, for example, can determine the second different content item 202 that is responsive to the second call for content 214. For example, the second different content item 202 that is selected can be based on call parameters that are included in the second call for content 214, e.g., including publisher preferences for the type of content item that is requested. The second different content item 202 can be presented, for example, in a second different content item slot 216 or can be free-floating, such as along the bottom of the web page.

In some implementations, the second different content item can be a floating content item whose placement on the resource is not specified by the publisher. For example, by default, the placement of second different content items can be determined in real time, e.g., to appear at the bottom of a page or some other place on the page (e.g., left side or right side) where the content item can be placed. In some implementations, the placement of the second different content item can be made so as to avoid overlapping other content.

In some implementations, the second different content item can be published at a location in the resource at a position that is self-determined rather than specified by the publisher. For example, the placement of the second different content item relative to the rest of the content of the page can depend on the display capabilities of the device on which the content is presented. The placement of the content item, for example, can correspond to a logical break (e.g., a paragraph break) in the web page content. In some implementations, the placement of the second different content item can depend on the location of specific content (e.g., text on the web page) to which the second different content item is related (e.g., based on keywords).

In some implementations, the second different content item can be presented at a different location on the resource than the first content item. For example, the content items may can appear in different places on the same web page (e.g., in two different content item slots), or on different pages, and can be adjacent or far apart.

In some implementations, the process 300 can further include providing a script to the publisher for inclusion on the resource. The script, when executed, can make the first call for content to a serving system. Also, responsive to the receipt of the first content item and the message, execution of the script can generate the second call to the serving system. For example, the content management system 110 can provide the publisher 109 with a script to embed into their web page. Executing the script can cause the first call for content 206 to be sent to the content management system 110. After receipt of the first content item 204 and the message 212 from the content management system 110, for example, the script can automatically send the second call for content 214 to the content management system 110. In some implementations, the initial script can install a listener process that is invoked at a time of receipt of the message that triggers logic to make the request for the second different content item.

In some implementations, the second call can be made without first making the content item request. For example, a tag need not be configured by the publisher to insert content items in a certain location; instead, the placement location of the second content item on the publisher page can be determined automatically.

In some implementations, the process 300 can further include enabling the second call without requiring the publisher to re-tag the resource and can include a specific call for the second different content item. For example, the use of the message 212 containing the call parameters can allow the second call for content 214 to be generated and sent automatically, requiring no additional work by the publisher 109.

Figure 4:
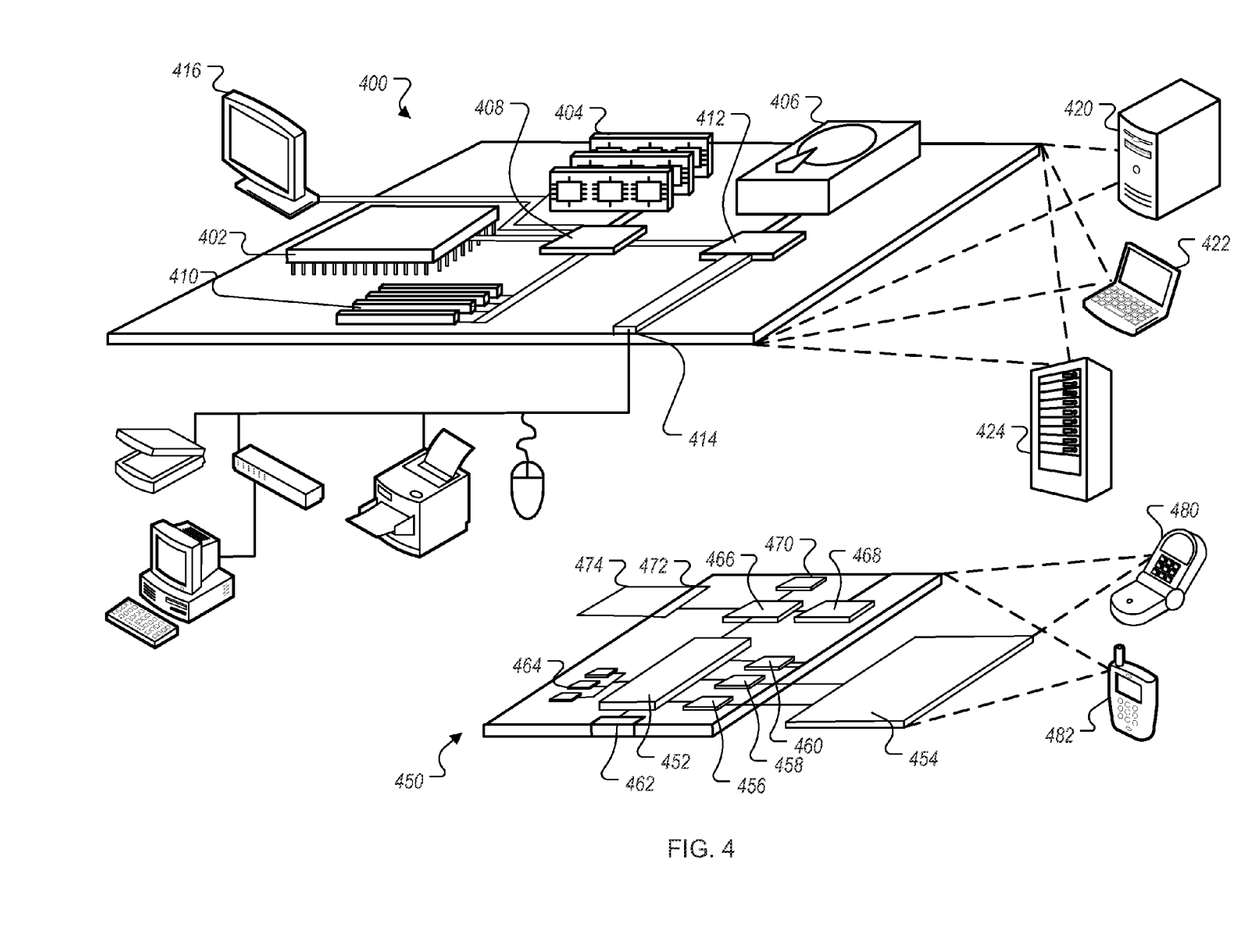
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate.

The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
receiving, at a server and from a requesting device, a first call for content to be published in a content item slot on a resource associated with a publisher, wherein the first call for content is generated by execution of a given tag included in the resource;
determining, by one or more processors, that the publisher has authorized one or more additional content item calls to be automatically initiated by the server responsive to the receipt of the first call;
determining, by the server, a first content item responsive to the first call;
generating, by the server, a message that causes the requesting device to initiate a second call for additional content independent of other tags embedded in the resource;
providing, by the server and to the requesting device, the first content item and the message responsive to the first call;
receiving, by the server and from the requesting device, the second call for content that was initiated by the message;
processing, by the server, the second call;
determining, by the server, a second different content item responsive to the second call; and
providing, by the server and to the requesting device, the second different content item for publication on the resource along with the first content item.

2. The method of claim 1 wherein determining that the publisher has authorized one or more additional content item calls to be automatically initiated by the server includes receiving a preference from the publisher that the resource automatically generate additional content item requests based on the initial received request.

3. The method of claim 2 wherein the preference applies to a plurality of resources associated with the publisher.

4. The method of claim 1 wherein determining that the publisher has authorized one or more additional content item calls to be automatically initiated by the server includes receiving a verification request from the requesting device and verifying that the publisher is enrolled in a service for automatically initiating second calls.

5. The method of claim 1 wherein generating the message includes identifying one or more publisher criteria associated with preferences for content to be provided responsive to the second call.

6. The method of claim 1 wherein generating the message includes automatically identifying a preferred type or format of content to be provided associated with the second call.

7. The method of claim 1 wherein generating the message includes identifying one or more reporting parameters for reporting effectiveness of content delivered in association with the second call.

8. The method of claim 1 wherein the second different content item is a floating content item whose placement on the resource is not specified by the publisher.

9. The method of claim 1 wherein the second different content item is published at a location in the resource at a position that is self-determined rather than specified by the publisher.

10. The method of claim 1 further including providing a script to the publisher for inclusion on the resource, wherein the script includes instructions that, when executed, makes the first call for content to a serving system, and responsive to receipt at the requesting device of the first content item and message, generates the second call to the serving system.

11. The method of claim 1 wherein the second call operates to request the second different content item without requiring the publisher to specify where on the resource the second different content item will be presented.

12. The method of claim 1 wherein the second different content item is presented at a different location on the resource than the first content item.

13. The method of claim 12 wherein the second different content item is a floating content item whose location is unspecified by the publisher.

14. The method of claim 1 further comprising enabling the second call without requiring the publisher to re-tag the resource and include a specific call for the second different content item.

15. The method of claim 1 wherein the message includes instructions for:
creating a frame, on the resource, to hold the second different content item;
requesting the second different content item; and
inserting the received second different content item in the created frame.

16. A computer program product embodied in a non-transitive computer-readable medium including instructions, that when executed, cause one or more processors to:
receive, at a server and from a requesting device, a first call for content to be published in a content item slot on a resource associated with a publisher, wherein the first call for content is generated by execution of a given tag included in the resource;
determine that the publisher has authorized one or more additional content item calls to be automatically initiated by the server responsive to the receipt of the first call;
determine, by the server, a first content item responsive to the first call;
generate, by the server, a message that causes the requesting device to initiate a second call for additional content independent of other tags embedded in the resource;
provide, by the server and to the requesting device, the first content item and the message responsive to the first call;
receive, by the server and from the requesting device, the second call for content that was generated in response to the requesting device;
process the second call;
determine, by the server, a second different content item responsive to the second call; and
provide, by the server and to the requesting device, the second different content item for publication on the resource along with the first content item.

17. The computer program product of claim 16 wherein determining that the publisher has authorized one or more additional content item calls to be automatically initiated by the server includes receiving a preference from the publisher that the resource automatically generate additional content item requests based on the initial received request.

18. The computer program product of claim 16 wherein the preference applies to a plurality of resources associated with the publisher.

19. The computer program product of claim 16 wherein determining that the publisher has authorized one or more additional content item calls to be automatically initiated by the server includes receiving a verification request from the requesting device and verifying that the publisher is enrolled in a service for automatically initiating second calls.

20. A system comprising:
  one or more processors; and
  one or more memory elements including instructions that, when executed, cause the one or more processors to:
    receive, at a server and from a requesting device, a first call for content to be published in a content item slot on a resource associated with a publisher, wherein the first call for content is generated by execution of a given tag included in the resource;
    determine that the publisher has authorized one or more additional content item calls to be automatically initiated by the server responsive to the receipt of the first call;
    determine, by the server, a first content item responsive to the first call;
    generate, by the server, a message that causes the requesting device to initiate a second call for additional content independent of other tags embedded in the resource;
    provide, by the server and to the requesting device, the first content item and the message responsive to the first call;
    receive, by the server and from the requesting device, the second call for content that was generated in response to the requesting device;
    process the second call;
    determine, by the server, a second different content item responsive to the second call; and
    provide, by the server and to the requesting device, the second different content item for publication on the resource along with the first content item.

* * * * *